United States Patent [19]

Santos et al.

[11] Patent Number: 5,307,013
[45] Date of Patent: Apr. 26, 1994

[54] DIGITAL POSITION SENSOR SYSTEM FOR DETECTING AUTOMATIC TRANSMISSION GEAR MODES

[75] Inventors: Alfred J. Santos, Canton Center; Michael C. Brauer, Goshen, both of Conn.

[73] Assignee: The Torrington Company, Torrington, Conn.

[21] Appl. No.: 965,558

[22] Filed: Oct. 23, 1992

Related U.S. Application Data

[63] Continuation of Ser. No. 680,143, Apr. 3, 1991, abandoned.

[51] Int. Cl.[5] .................... G01B 7/14; H03M 1/22; H01H 36/00; H01L 43/06
[52] U.S. Cl. .................... 324/207.2; 324/207.24; 338/32 H; 341/15; 74/475; 74/866
[58] Field of Search .......... 324/207.2, 207.12, 207.13, 324/207.22, 207.24; 338/32 H; 307/309; 341/15; 74/335, 866, 475, 491

[56] References Cited

U.S. PATENT DOCUMENTS

| | | | |
|---|---|---|---|
| 4,022,078 | 5/1977 | Malott | 74/475 |
| 4,555,120 | 11/1985 | Frait et al. | 280/6.1 |
| 4,610,179 | 9/1986 | Parker | 338/32 H |
| 4,663,853 | 5/1987 | Indo et al. | 33/125 |
| 4,712,420 | 12/1987 | Johansson et al. | 73/118.1 |
| 4,757,257 | 7/1988 | Washisu | 324/207.24 |
| 4,792,788 | 12/1988 | Kumar | 324/207.2 |
| 4,810,967 | 3/1989 | Yokoyama et al. | 324/207.2 |
| 4,836,578 | 6/1989 | Soltis | 280/840 |
| 4,853,629 | 8/1989 | Rops | 324/208 |
| 4,909,560 | 3/1990 | Ginn | 296/65.1 |
| 4,916,263 | 4/1990 | Ichigo | 200/11 DA |
| 5,009,128 | 4/1991 | Seidel et al. | 74/866 |

Primary Examiner—Walter E. Snow
Attorney, Agent, or Firm—Michael H. Minns; John C. Bigler

[57] ABSTRACT

A sensor system for detecting gear modes of an automobile transmission is disposed about a detent lever internally within the transmission case. The system includes an encoder capable of generating a magnetic field disposed on or about a detent lever, and at least one sensor, such as a Hall-effect sensor, disposed opposite the encoder. The encoder is a magnetic strip having at least one track encoded thereon, wherein the sensor is juxtaposed with the encoded track such that it produces a digital signal representative of the position of the encoder means and the corresponding gear mode.

14 Claims, 5 Drawing Sheets

| GEAR | SENSOR 1 | SENSOR 2 | SENSOR 3 |
|---|---|---|---|
| 1 | 0 | 0 | 0 |
| 2 | 0 | 0 | 1 |
| 3 | 0 | 1 | 1 |
| 4 | 0 | 1 | 0 |
| N | 1 | 1 | 0 |
| R | 1 | 1 | 1 |
| X | 1 | 0 | 1 |
| P | 1 | 0 | 0 |

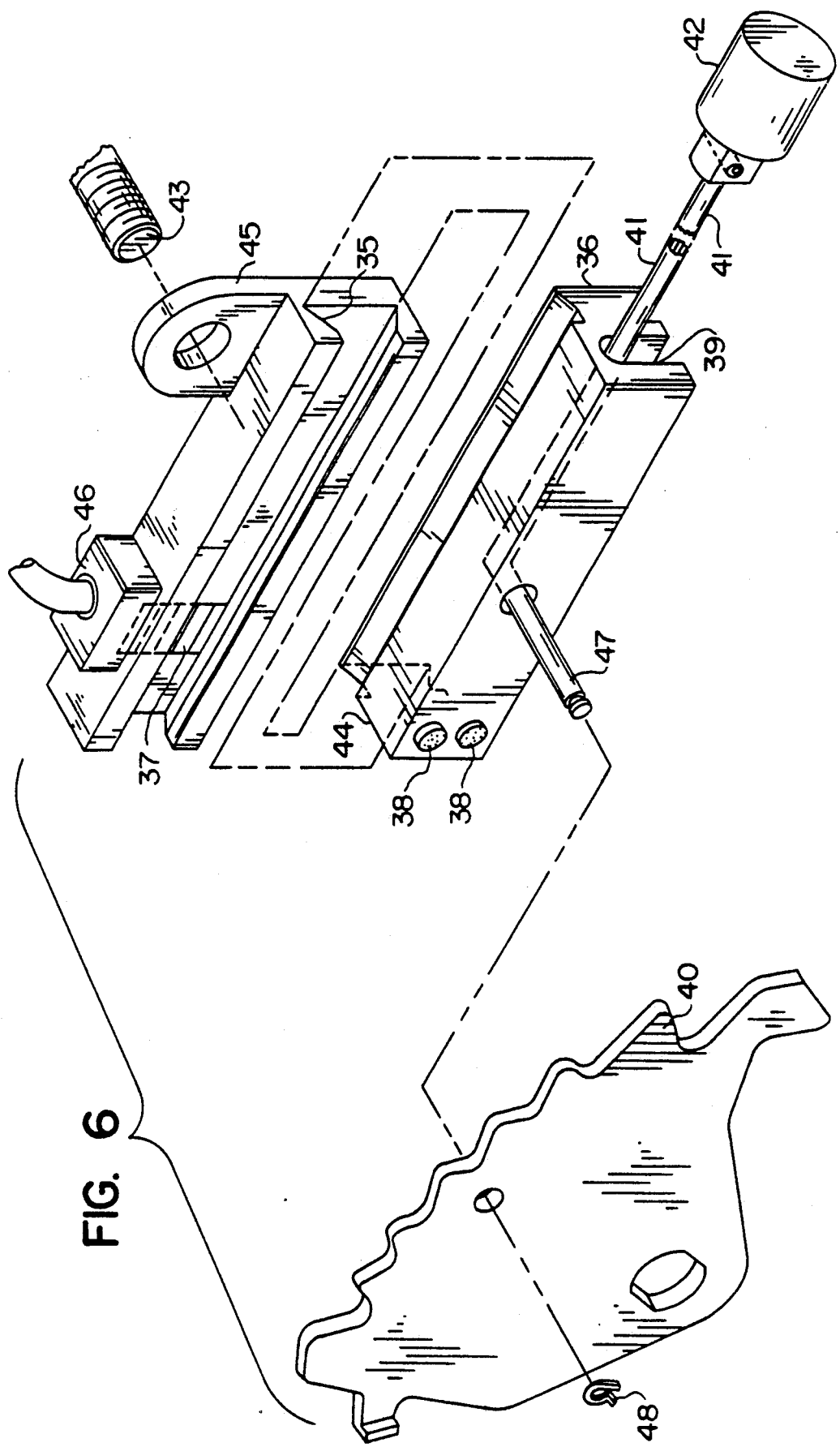

DIGITAL POSITION SENSOR SYSTEM FOR DETECTING AUTOMATIC TRANSMISSION GEAR MODES

This application is a continuation of U.S. patent application Ser. No. 680,143, filed Apr. 3, 1991, now abandoned.

This invention relates generally to sensors to detect the position of a detent lever or manual valve in an automatic transmission. In particular, the present invention provides a sensor capable of detecting changes in magnetic fields and generating a digital electrical signal indicative of the transmission gear mode which has been selected by the vehicle operator.

BACKGROUND OF THE INVENTION

To engage an automatic transmission into a specific gear mode, i.e., park (P), reverse (R), neutral (N), drive (D or 4), and low drives (1, 2 and 3), a manual valve must be moved into proper position so that hydraulic pressure can be directed to appropriate transmission components. Likewise, a parking rod must be positioned for proper engagement when in (P). The manual valve and parking rod are linked to the transmission selector lever (located in the passenger compartment) via a detent lever, within the transmission case. Conventional mode switches, which are designed to provide an electrical signal based on the gear selected, are connected to this linkage and are located outside the transmission case.

With conventional mode switches, an electrical signal is generated by sliding contacts. As a linkage rotates, electrical contacts slide along a uniquely designed pad to produce electrical signals. Such electrical signals can be used in transmission control algorithms and with electronic gear-selection displays.

Some of the more prevalent problems with this type of external, mechanical switch are: (1) positional adjustment is required during installation; (2) poor accuracy results from the tolerance stack-up of the many components involved (i.e., the output of the switch may indicate a gear mode that has not been selected); (3) sealing from the environment is required; and (4) the sliding contacts of these mechanical switches are prone to corrosion and wear, which results in poor electrical contact.

Magnetic field sensors have been proposed to replace conventional mode switches to indicate a selected gear of an automatic transmission. Such sensors would detect binary control signals generated when a code slide with a pattern or protuberances is moved across a magnetic field. However, these proposed magnetic field devices relate to sensors disposed outside the transmission housing and indicate the position of a shift lever, not the gear mode of the transmission itself. For those reasons, such devices solve few of the listed problems associated with external mechanical switches.

The foregoing illustrates limitations known to exist in present sensors to detect a selected gear of an automatic transmission. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention, this is accomplished by providing a sensor system for automatic transmissions for detecting gear modes. The sensor system is disposed about a detent lever internally within the transmission case. The sensor system includes an encoder means, disposed on or about a detent lever, capable of generating a magnetic field and at least one sensor disposed opposite the encoder means.

In a preferred embodiment of the present invention, the encoder means is a magnetic strip having a least one binary code track encoded thereon, and the sensor means is a Hall-effect or other magnetic field sensor means juxtaposed with the encoded track such that it produces a digital signal representative of the position of the encoder means and the corresponding gear mode.

The foregoing and other aspects will become apparent from the following detailed description of the invention when considered in conjunction with the accompanying drawing figures.

BRIEF DESCRIPTION OF THE DRAWINGS

FIG. 6 is an exploded view of a third embodiment of the present invention, wherein a linear moving encoder and a sensor are disposed about a detent lever;

DETAILED DESCRIPTION

Figure 1:
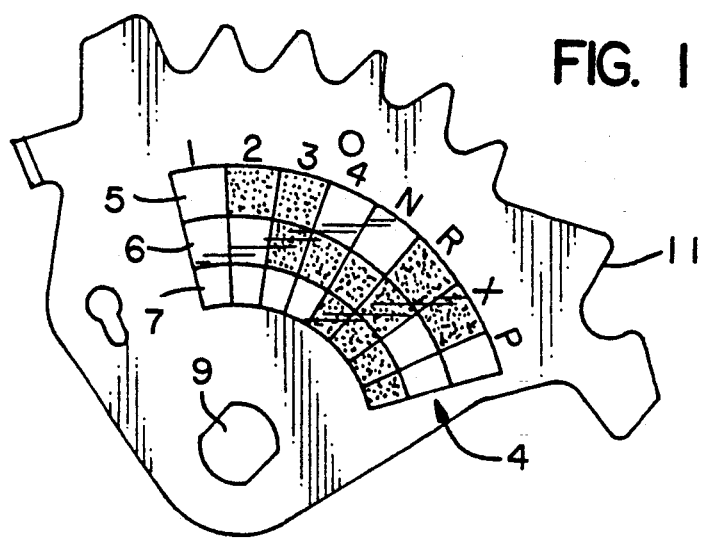
FIG. 1 is a simplified representation of a detent lever of an automatic transmission having a three-track binary code encoder disposed thereon according to one embodiment of the present invention.

FIG. 1 depicts a detent lever 11 of an automatic transmission having notches or detents corresponding to gear modes (1, 2, 3, 4, N, R, and P). The detent lever 11 is within the housing of the transmission and is typically a steel plate secured to a shaft rotated from outside the housing. Springloaded engagement with the detents holds the transmission in gear. An extension (X) provides additional resistance to movement between reverse and park.

Figure 3:
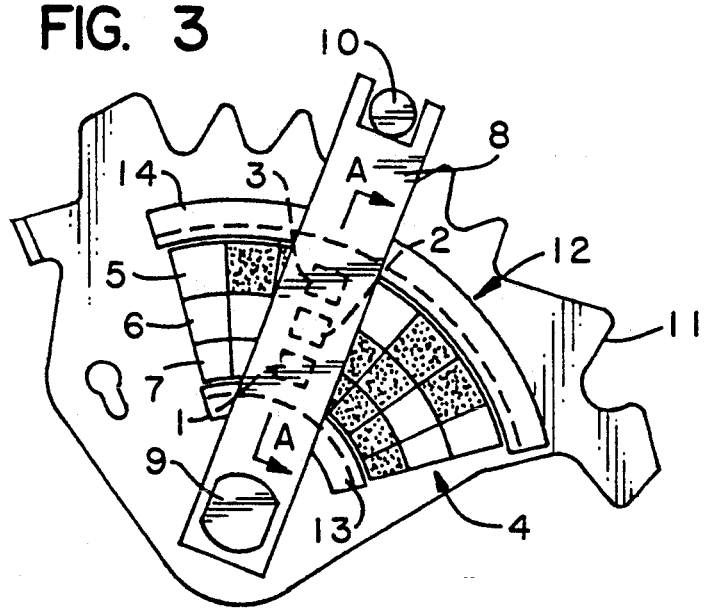
FIG. 3 is a simplified representation of the detent lever together with a sensor means disposed thereupon according to the embodiment of FIG. 1.

FIG. 3 depicts a preferred embodiment of the present invention, wherein three separate Hall-effect sensors 1,2,3, are disposed directly opposite a binary code encoder (e.g., magnetic poles) 4 having three separate binary code encoded tracks 5,6,7. Hall-effect sensors 1,2,3 and encoder 4 generate distinct outputs that correspond to detent positions on the detent lever and gear modes. Sensor mount assembly 8 containing Hall-effect sensors 1,2,3 is held between a detent lever shaft 9 and a detent lever spring 10. Encoder 4 is affixed to detent lever 11 and positioned directly underneath sensor mount assembly 8. As detent lever 11 rotates back and forth (e.g., when the operator is selecting a gear), encoder 4 switches individual Hall-effect sensors 1,2,3 on or off, generating a distinctive output corresponding to each gear mode.

Figure 3A:
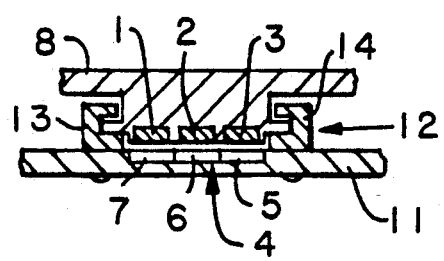
FIG. 3A is a cross-sectional view along line A—A of FIG. 3.

It t to maintain a specified air gap between Hall-effect sensors 1,2,3 and encoder 4. FIG. 3A shows that an encoder mount assembly 12 formed of a non-magnetic material (e.g., polyetherimide) and having one or more guides 13 and 14, may be moved with respect to sensor mount assembly 8. Encoder mount assembly 12 is designed to maintain a predetermined air gap between the Hall-effect sensors and the encoder, while permitting the encoder to move radially with respect to the sensor mount assembly as changes of gear modes occur. FIG. 3A also shows that tracks 5,6,7 are aligned directly underneath their corresponding Hall-effect sensors 3,2,1 to ensure proper detection of gear mode changes. Encoder mount assembly 12 is affixed to detent lever 11 by any mechanical means, e.g., snap or heat stake.

Figures 2, 4:
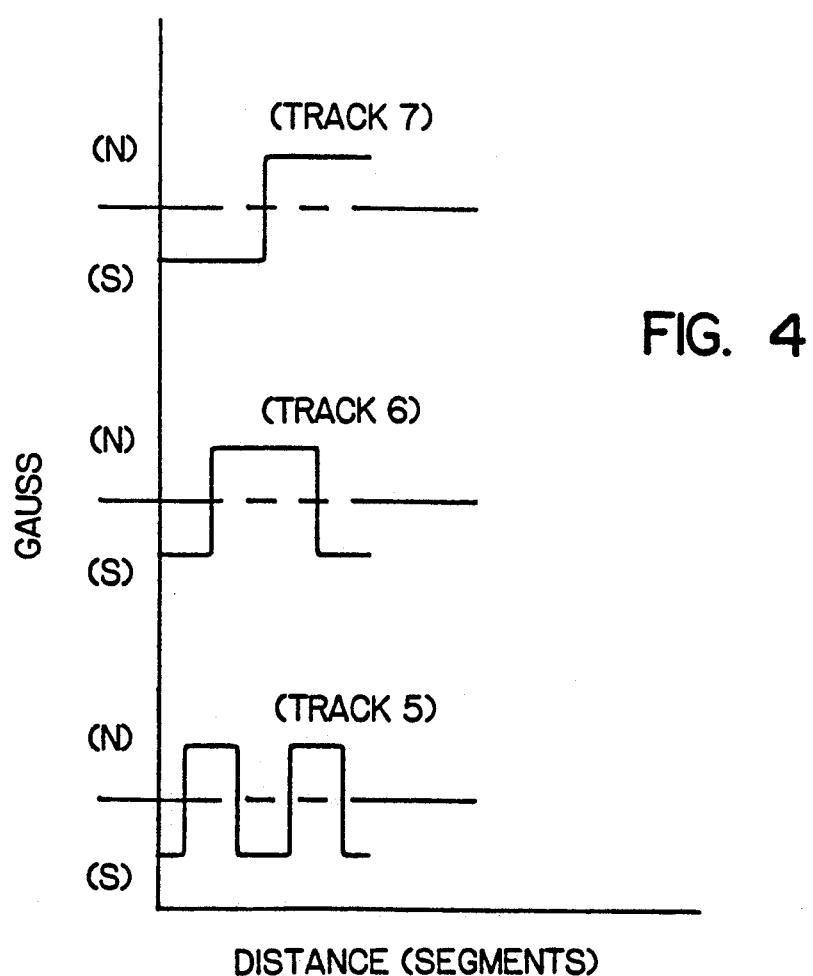
FIG. 2 is a chart illustrating the output of sensors for each gear mode according to the embodiment of FIG. 1.
FIG. 4 is a series of graphs depicting the waveforms generated by the track on the encoder of the embodiment of FIG. 1.

FIGS. 2 and 4 depict binary code signals detected by the Hall-effect sensors as they traverse the three tracks of the encoder of FIG. 1. Encoder 4 has been magnetized with various North and South segments, i.e., North segments appear black and South segments appear white. Each gear mode (1234NRP) is designated by an individual magnetic segment from each of the tracks 5,6,7. For example, gear (1) is defined by a South segment in each of tracks 5,6,7, whereas gear (N) is defined by track 7 having a North segment, track 6 having a North segment and track 5 having a South segment. The North segments will turn the overlying Hall-effect sensor "on" (depicted as "1") and the South segments will turn it "off" (depicted as "0").

The graph in FIG. 4 illustrates the output voltage of each sensor 1,2,3 as encoder 4 traverses those sensors. For example, track 7, which includes four South segments followed by four North segments, generates a voltage signal having a straight line followed by a pulse of equal length. Track 6, which includes two South segments, four North segments and two additional South segments, generates a voltage signal having a straight line followed by a pulse twice as long as the previous straight line which is followed by a short straight line. Track 5, which includes one South segment, two North segments, two South segments, two North segments and one South segment generates a voltage signal having a straight line, a pulse, a straight line, a pulse and a straight line.

The binary code signals depicted in FIG. 4 correspond directly to the outputs of Hall-effect sensors 1,2,3. These signals may repeat in such a manner that a sequential transition between two particular code words can occur in only one direction. For example, with reference to FIG. 2, the transition from the word 011 to the word 010 can only occur when the detent lever 11 is moved from gear mode 3 to gear mode 4. Conversely, the transition from the word 010 to the word 011 can only occur when the detent lever is moved from gear mode 4 to gear mode 3. Accordingly, the control module will know the direction in which the sensor is moving because of the order in which the code words occur. Preferably, the binary code is of a type known as a Gray code, having only one of the three digits of each code word change from position to adjacent position.

Encoder 4 is shaped so that each gear mode will turn the three Hall-effect sensors on or off in the unique pattern illustrated in FIG. 2. As can be seen, a Gray code was chosen for this electrical output. When moving from one gear mode to another, one and only one Hall-effect sensor switches states. If zero, two or all three sensors switch states, then the vehicle's system computer would detect an error.

Figure 5:
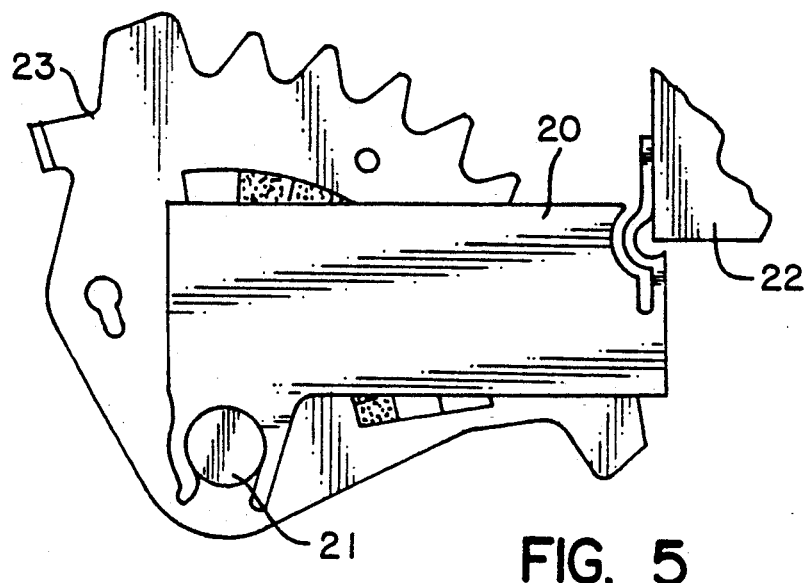
FIG. 5 is a simplified representation of another embodiment of the present invention, wherein the sensor mount assembly is connected to the detent lever shaft and a channel plate.
Figure 5A:
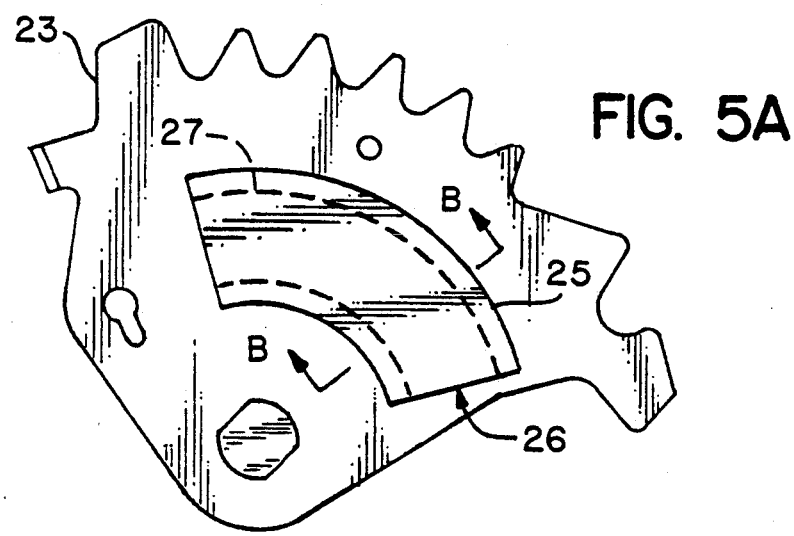
FIG. 5A is a simplified representation of the detent lever and encoder mount assembly of FIG. 5.
Figure 5B:
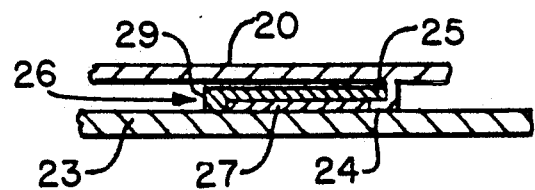
FIG. 5B is a cross-sectional view along line B—B of FIG. 5A together with portions of the sensor mount assembly of FIG. 5.

An alternate embodiment is shown in FIGS. 5-5B, wherein sensor mount assembly 20 similar to sensor mount assembly 8 is affixed to detent lever shaft 21. The sensor mount assembly 20 snaps or screws onto channel plate 22 of the transmission instead of to a detent lever spring. Detent lever 23 and an encoder 27 rotate with respect to the sensor mount assembly 20.

As shown in FIG. 5C, sensor mount assembly 20 includes a guide or hook 24 that fits about a guide or lip 25 of an encoder mount assembly 26 in order to maintain a predetermined air gap between Hall-effect sensors and an encoder 27. Encoder mount assembly 26 is best shown in FIG. 5B, wherein encoder 27 is encapsulated in a polyetherimide housing 29 having guide 25 at one end thereof. Encoder mount assembly 26 has a radial configuration to permit it to rotate about the stationary sensor mount assembly such that the Hall-effect sensors can obtain an accurate reading of each binary code associated with gear mode changes. Encoder mount assembly 26 can be affixed to detent lever 23 by any means known to those skilled in the art.

Another embodiment according to the present invention is illustrated in FIGS. 6-6A, wherein an encoded magnet or encoder 36 moves linearly, instead of radially, with respect to a sensor 37. In this design, an encoder housing 44 and a detent lever 40 are connected to gear shift spool 42 via an L-shaped rod 41 having a hook 47 and clip 48. Encoder housing 44 is slidingly mounted on a sensor mount assembly 45 by dovetails 35 or other means. The sensor mount assembly 45 is pivotably mounted at point 43 and includes a power source connector 46 and sensors 49. Encoder housing 44 has a channel 39 for guiding the rod 41 and is capable of linear movement with respect to the sensor mount assembly 45 to permit detection of the various gear modes. That is, when detent lever 40 is rotated to change gear modes by means of spool 42, encoder housing 44 is moved a corresponding linear distance with respect to sensor mount assembly 45. Guide pads 38 may be mounted on the encoder housing 44 or sensor mount assembly 45 to facilitate sliding with respect to the detent lever 40.

A full arc magnet is preferably encoded with a binary code having a pattern similar to that set forth in FIG. 1. Since it is highly desirable to make the encoder as compact as possible, the end code should be 000 and the outside corners should also be 0. The encoded tracks can also be compressed to efficiently satisfy the compact space requirements of the sensor system. The encoder can be encoded with a binary code by any means known to those skilled in the art, e.g., physical magnetic blocks, magnetic writing and shaped field magnetization techniques.

The encoder is shaped in such a manner that when the encoder moves with respect to the Hall-effect sensors, the Hall-effect sensors produce a digital code indicating the position of the encoder. The encoder shape should also be such that during radial applications the Hall-effect sensors line up with encoded track segments corresponding to a specific gear mode.

Figure 7:
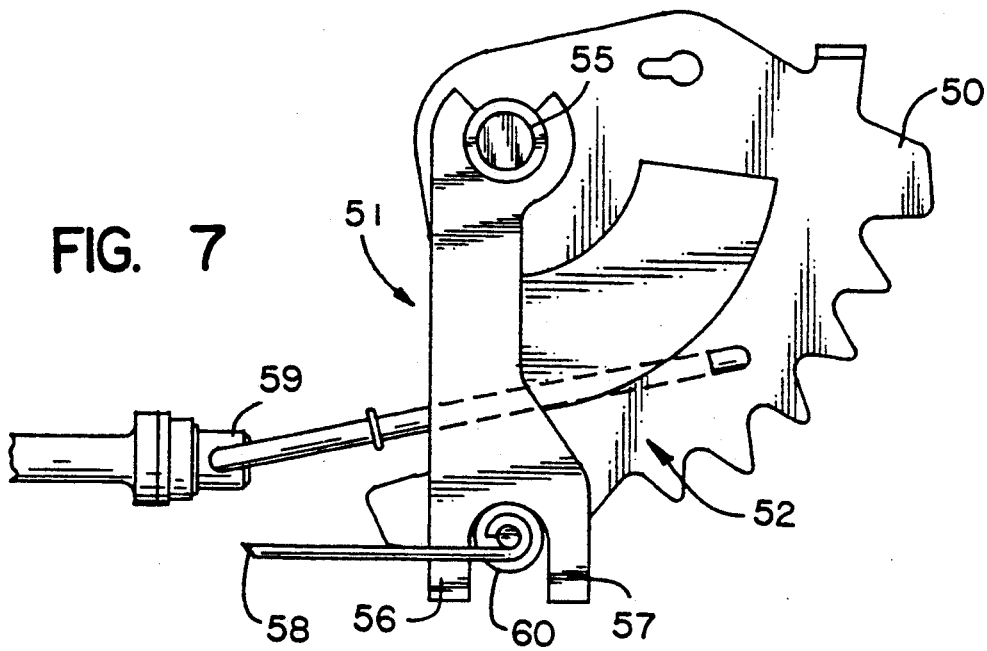
FIG. 7 is a more detailed representation of an embodiment of the present invention similar to that of FIG. 1, wherein a sensor housing is connected to a detent lever shaft and a detent lever spring roller within an automatic transmission.

This may require alteration of segment sizes from one track to the next. Another preferred embodiment of the present invention is set forth in FIGS. 7-7B, wherein FIG. 7 shows a detent lever 50, a sensor mount assembly 51, and an encoder mount assembly 52 disposed within an automatic transmission 54. Encoder mount assembly 52 is affixed to detent lever 50 in such a manner that its encoded track segments directly correspond to gear modes of the transmission. One end of sensor mount assembly 51 is designed to snap over and pilot from detent lever shaft 55 and the other end has two fingers 56 and 57 that straddle roller of detent lever spring 58. Since detent lever shaft 55 is stationary and detent lever spring 58 does not rotate about detent lever shaft 55, sensor mount assembly 51 remains stationary. This is required to provide proper accuracy of electrical outputs.

Figure 7A:
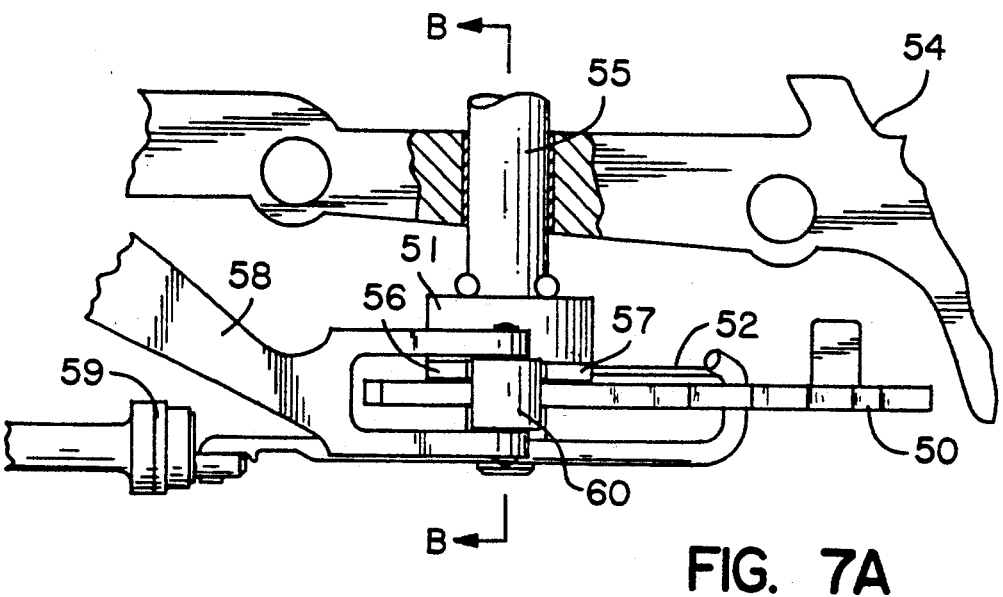
FIG. 7A is a side view of the sensor system of FIG. 7.

FIG. 7A illustrates how fingers 56 and 57 of sensor mount assembly 51 straddle roller 60 of detent lever spring 58. As detent lever 50 is moved by gear shift spool 59 during the changing of gear modes, detent lever spring 58 moves in and out from detent lever 50 as roller 60 traverses the perturbations of detent lever 50. The design of sensor mount assembly 51 is such that roller 60 can move linearly between fingers 56 and 57 while it traverses the perturbations of detent lever 50 without disturbing the stationary position of sensor mount assembly 51.

Figure 7B:
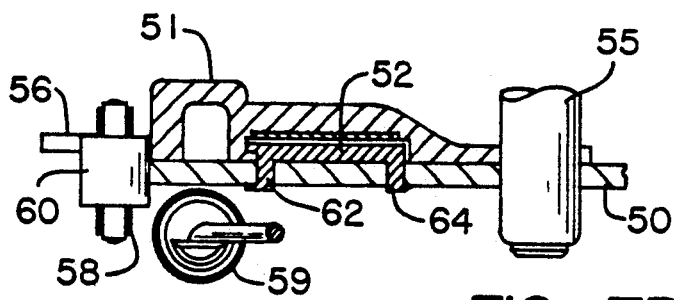
FIG. 7B is a cross-sectional view along line B—B of FIG. 7A.

The cross-sectional view of FIG. 7B depicts a guide or hook on the bottom of sensor mount assembly 51 which engages with a guide or lip on encoder mount assembly 52. This guide prohibits sensor mount assembly 51 from lifting relative to detent lever 50, thereby providing a predetermined and constant air gap between the Hall-effect sensors and the encoder surface. This air gap control, along with roller 60 and detent lever shaft 55, allow the sensor mount assembly 51 to be held close to the encoder. Encoder mount assembly 52 is held stationary relative to the detent lever by snap fitting legs 62,64 through prepunched holes in the detent lever, or any other conventional means of affixing it thereto. Encoder mount assembly 52 includes an encoder encapsulated within a non-conductive polyetherimide housing.

Both the assembly and disassembly of this system are straightforward. The encoder mount assembly is snapped into place on the face of the detent lever, and the detent lever is then installed in its normal fashion. In the radial design, the sensor mount assembly is snapped over the detent lever shaft in the transmission. This is done by sliding the sensor mount assembly along the detent lever face between the park mechanism and the encoder mount assembly. The sensor mount assembly is rotated over the face of the encoder mount assembly, engaging the piloting lip or encoder guide means therebetween. To rotate the sensor mount assembly, the detent lever spring must be pulled back to allow the fingers of the sensor mount housing to clear the roller of the detent lever spring. This design permits rotation of the encoder mount assembly with respect to the sensor mount assembly and maintains a predetermined air gap between the sensor mount assembly.

Alternatively, the sensor mount assembly can be affixed between the detent lever shaft and the channel plate of the transmission to maintain its stationary position with respect to the encoder mount assembly.

In accordance with the linear design, a linear moving encoder is mechanically connected to the moving spool of the channel plate and the detent lever, such that the encoder is capable of moving only linearly with respect to the sensors as gear modes change.

The disassembly of the sensor system is as simple as its installation, even for a transmission located in a vehicle.

Once the transmission pan is removed, the sensor system is clearly visible. In the radial design, the detent lever spring may be pulled radially outward, permitting the sensor mount assembly to be rotated counter-clockwise until it contacts the park (P). The sensor mount assembly can then simply be unsnapped from the detent lever shaft and removed. If required, the encoder mount assembly can then be unsnapped from the detent lever.

Having described the invention, what is claimed is:

1. A sensor system for detecting gear modes of an automatic transmission, the automatic transmission having a detent lever located internal to a transmission case, the sensor system comprising:

an encoder means fixed to the detent lever, the encoder means having multiple magnetic elements arranged in at least three parallel binary code tracks, the magnetic elements being arranged in a plurality of sets, each set consisting of one magnetic element from each binary code track, the magnetic elements in a set corresponding to a transmission gear mode, the polarity of the magnetic elements in a set uniquely identifying a transmission gear mode;

at least three sensor means disposed opposite the encoder means for detecting changes of the gear modes, each sensor means being a magnetic field sensor which produces a digital signal, the digital signals of the at least three sensor means being representative of the position of the encoder means thereby indicating the transmission gear modes, the digital signals of the at least three sensor means being unique for each transmission gear mode, the sensor means being mounted in a sensor mount assembly; and a guide means including a lip for allowing relative transverse motion between the encoder means and sensor means and for allowing relative separation between the encoder means and the sensor means only when a pre-determined distance between the encoder means and the sensor means is not exceeded, the guide means being integral with at least one of the sensor means and the encoder means.

2. The sensor system according to claim 1 wherein the sensor mount assembly is slidably interlocked with one of the encoder means or the detent lever.

3. The sensor system according to claim 1 wherein the detent lever has a shaft and the sensor mount assembly is connected to the shaft.

4. The sensor system according to claim 1 wherein the detent lever has a shaft and the detent lever is retained in a specific gear mode by a retention spring and the sensor mount assembly is connected to the shaft and slidingly connected to the retention spring.

5. The sensor system according to claim 1 wherein the detent lever has a shaft and the sensor mount assembly is connected to the detent lever shaft and to a stationary part of the automatic transmission.

6. A sensor system for detecting gear modes of an automatic transmission, the automatic transmission having a detent lever located internal to a transmission case, the sensor system comprising:
- an encoder means fixed to the detent lever, the encoder means having multiple magnetic elements arranged in at least three parallel binary code tracks, the magnetic elements being arranged in a plurality of sets, each set consisting of one magnetic element from each binary code track, the magnetic elements in a set corresponding to a transmission gear mode, the polarity of the magnetic elements in a st uniquely identifying a transmission gear mode;
- at least three sensor means disposed opposite the encoder means for detecting changes of the gear modes, each sensor means being a magnetic field sensor which produces a digital signal, the digital signals of the at least three sensor means being representative of the position of the encoder means thereby indicating the transmission gear modes, the digital signals of the at lest three sensor means being unique for each transmission gear mode, the encoder means moving radially with respect to the sensor means;
- a sensor mount assembly for mounting the sensor means, the sensor mount assembly being slidable interlocked with one of the encoder means of the detent lever; and
- a guide means including a lip for allowing relative transverse motion between the encoder means and sensor means and for allowing relative separation between the encoder means and the sensor means only when a pre-determined distance between the encoder means and the sensor means is not exceeded, the guide means being integral with at least one of the sensor means and the encoder means.

7. The sensor system according to claim 6 wherein the detent lever has a shaft and the sensor mount assembly is connected to the shaft.

8. The sensor system according to claim 6 wherein the detent lever has a shaft and the detent lever is retained in a specific gear mode by a retention spring and the sensor mount assembly is connected to the shaft and slidingly connected to the retention spring.

9. The sensor system according to claim 6 wherein the detent lever has a shaft and the sensor mount assembly is connected to the shaft and to a stationary part of the automatic transmission.

10. A sensor system for detecting gear modes of an automatic transmission, the automatic transmission having a detent lever located internal to a transmission case, the sensor system comprising;
- an encoder means fixed to the detent lever, the encoder means having multiple magnetic elements arranged in at least three parallel binary code tracks, the magnetic elements being arranged in a plurality of sets, each set consisting of one magnetic element from each binary code track, the magnetic elements in a set corresponding to a transmission gear mode, the polarity of the magnetic elements in a set uniquely identifying a transmission gear mode;
- at least three sensor means disposed opposite the encoder means for detecting changes of the gear mode, each sensor means being a magnetic field sensor which produces a digital signal, the digital signals of the at least three sensor means being representative of the position of the encoder means thereby indicating the transmission gear modes, the digital signals of the at least three sensor means being unique for each transmission gear mode, the sensor means being mounted in a sensor mount assembly, the encoder means and the sensor means moving linearly with respect to each other; and
- a guide means including a lip for allowing relative transverse motion between the encoder means and the sensor means and for allowing relative separation between the encoder means and the sensor means only when a pre-determined distance between the encoder means and the sensor means is not exceeded, the guide means being integral with at lest one of the sensor means and the encoder means.

11. The sensor system according to claim 10 wherein the sensor means and the encoder means are slidably interlocked with each other.

12. The sensor system according to claim 10 wherein the sensor mount assembly is pivotably mounted on the automatic transmission.

13. A sensor system for detecting gear modes of an automatic transmission, the automatic transmission having a detent lever located internal to a transmission case, the sensor system comprising:
- an encoder means fixed to the detent lever, the encoder means having multiple magnetic elements arranged in at least three parallel binary code tracks, the magnetic elements being arranged in a plurality of sets, each set consisting of one magnetic element from each binary code track, the magnetic elements in a set corresponding to a transmission gear mode, the polarity of the magnetic elements in a set uniquely identifying a transmission gear mode;
- at least three sensor means disposed opposite the encoder means for detecting changes of the gear modes, each sensor means being a magnetic field sensor which produces a digital signal, the digital signals of the at least three sensor means being representative of the position of the encode means thereby indicating the transmission gear modes, the digital signals of the at least three sensor means being unique for each transmission gear mode;
- the encoder means and the sensor means moving linearly with respect to each other; the sensor means and the encoder means being slidably interlocked with each other; and
- a guide means including a lip for allowing relative transverse motion between the encoder means and sensor means and for allowing relative separation between the encoder mean and the sensor means only when a pre-determined distance between the encoder means and the sensor means is not exceeded, the guide means being integral with at least one of the sensor means and the encoder means.

14. The sensor system according to claim 13 further comprising:
- an encoder mount assembly for mounting the encoder, the encoder mount assembly being connected to a gear shift spool linkage and the detent lever, the encoder mount assembly having a slot therein for permitting motion relative to the gear shift spool linkage.

* * * * *

UNITED STATES PATENT AND TRADEMARK OFFICE
CERTIFICATE OF CORRECTION

PATENT NO.  : 5,307,013
DATED       : April 26, 1994
INVENTOR(S) : Alfred J. Santos and Michael C. Brauer It is certified that error appears in the above—identified patent and that said Letters Patent is hereby corrected as shown below:

On the cover sheet, item [75]:

Inventors:    Alfred J. Santos, Farmington;

Michael C. Brauer, Goshen, both of

Conn.

Signed and Sealed this

Eighth Day of November, 1994

*Attest:*

BRUCE LEHMAN

*Attesting Officer*    *Commissioner of Patents and Trademarks*